Sept. 25, 1962
G. H. LOWRIE
3,055,693
BALE HOOK
Filed Nov. 25, 1960
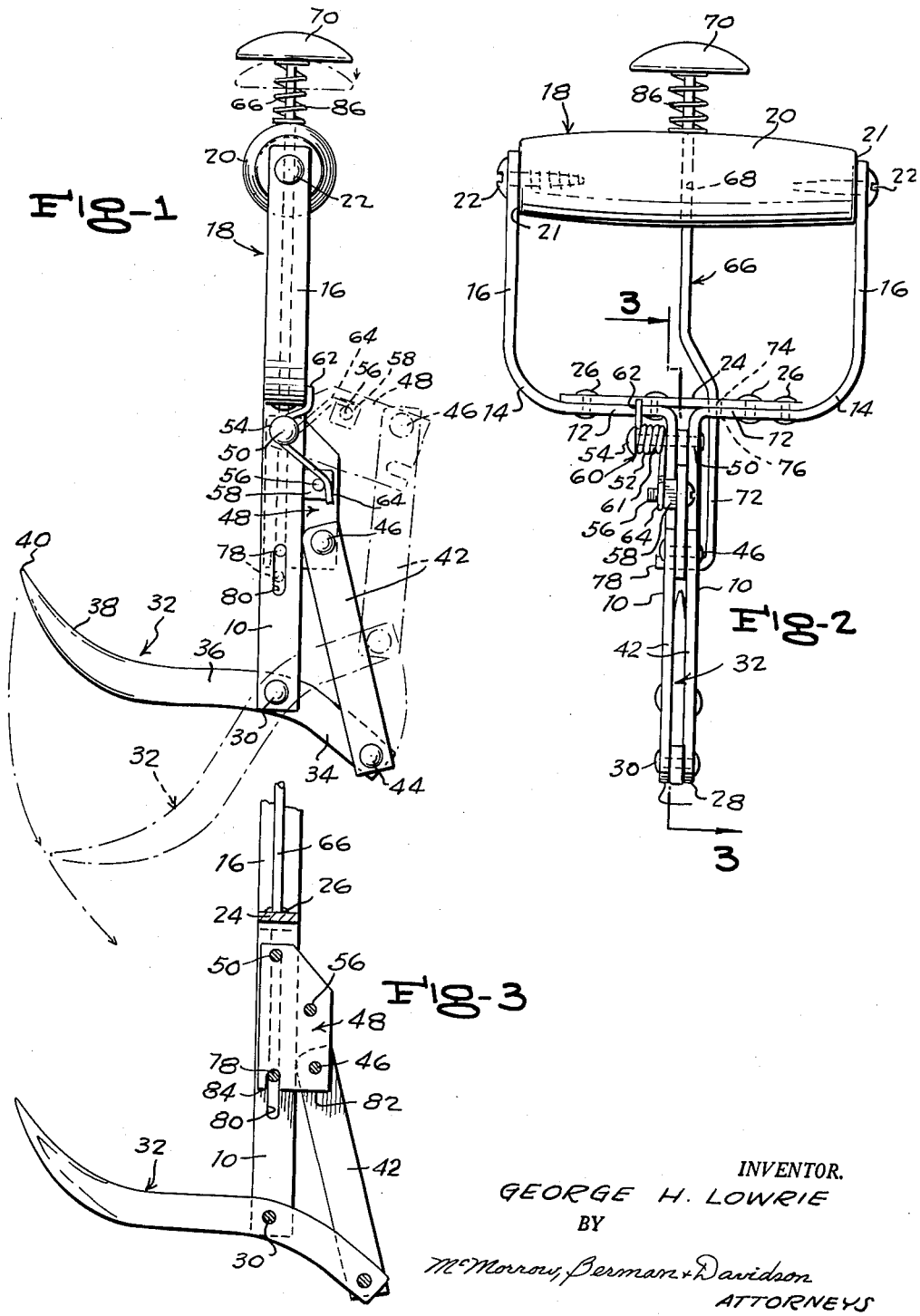
INVENTOR.
GEORGE H. LOWRIE
BY
McMorrow, Berman & Davidson
ATTORNEYS

United States Patent Office 3,055,693
Patented Sept. 25, 1962

3,055,693
BALE HOOK
George H. Lowrie, R.R. 2, Stewartville, Minn.
Filed Nov. 25, 1960, Ser. No. 71,764
6 Claims. (Cl. 294—26)

This invention relates to a novel and improved bale handling hook of the type having a hook element.

The primary object of the invention is the provision of a mechanically and structurally superior, more efficient, and more practical device of the kind indicated, and which is more easily and safely manipulable in use.

Another object of the invention is the provision of a more easily released device of the character indicated above which has improved hook element retaining means, in conjunction with improved releasing means.

A further object of the invention is the provision of a device of the character indicated above which has a bale handle having a hand-grip cross member, through which a part of the releasing means works, said part having a depressible knob located above the hand-grip cross member for easier operation of the releasing means.

Other important objects and advantageous features of the invention will be apparent from the following description and the accompanying drawings, wherein, for purposes of illustration only, a specific form of the invention is set forth in detail.

In the drawings:

FIGURE 1 is an edge elevation of a bale hook of the present invention, showing the hook element in operative position in full lines, and in released position in phantom lines;

FIGURE 2 is a side elevation of said bale hook, taken from the right of FIGURE 1, with the hook element in operative position; and, FIGURE 3 is a fragmentary vertical section taken on the line 3—3 of FIGURE 2.

Referring in detail to the drawings, wherein like numerals designate like parts throughout the several views, the illustrated bale hook comprises a pair of parallel, laterally spaced vertically elongated flat side bars 10 having oppositely laterally outwardly extending right angular arms 12, on their upper ends. The arms 12 merge, at their outer ends into arcuate ends 14 which terminate in upstanding parallel perpendicular legs 16 of a bail handle 18, which includes a hand-grip cross member 20. The cross member 20 is generally cylindrical and of a comfortably large cross section and tapered toward its opposite ends 21, which engage the inner sides of the legs 16, to which the cross member is suitably secured, as by means of screws 22 extending through the legs at their upper ends and threaded into the ends of the cross bar 20.

The side bars 10 are spaced and connected, at their upper ends, and the arms 12, and hence the handle 18 are strengthened and braced relative to each other, by means of a horizontal brace bar 24 which bears upon the upper sides of the lateral arms 12 and is fixed thereto, at its opposite ends, as indicated at 26.

The vertical side bars 10 have free lower ends 28 which are traversed thereat by a headed pivot pin 30 on which a pivoted hook element 32 is mounted between the bars 10. The hook element 32 comprises a flat shank portion having a downwardly curved rear portion 34 and an upwardly curved forward portion 36, the latter merging into an upwardly curved terminal 38 having a point 40 on its free end. The hook element 32 is pivoted on the pin 30 at a location between the portions 34 and 36.

Retaining means is provided for retaining the hook element 32 in its operative position, wherein the terminal 40 is spaced above the lower ends 38 of the side bars 10, in a generally perpendicular relationship to the side bars 10.

The retaining means comprises a pair of laterally spaced vertical elongated links 42, which, at their lower ends, are pivoted to opposite sides of the rear end of the hook element 32, as indicated at 44. The links 42 are located behind and are in the same planes as the side bars 10, and are pivoted, at their upper ends, as indicated at 46, to opposite sides of the lower rear corner of a toggle plate 48 which is positioned between the side bars 10. It is to be noted that the toggle plate 48 and link 42 and constituting a toggle linkage are pivotally connected at a point which forms the central pivot of the toggle linkage, the central pivot being adjacent the toggle linkage center line in the retaining position and remaining on the same side of the center line at all times so that any weight on the hook 32 will tend to collapse the toggle linkage and allow the hook 32 to pivot to a weight-releasing position.

The toggle plate 48 is wider than the side bars 10 and extends rearwardly therefrom, as seen in FIGURE 3, and is pivoted, at its upper forward corner, on an extended length pivot pin 50 which extends securably through the side bars 10, at a location near to and spaced below the lateral arms 12. The pivot pin 50 has an extension 52, reaching laterally beyond a side bar 10 and provided with an enlarged head 54.

A bolt 56 extends through the toggle plate 48 at a location spaced above and substantially in vertical alignment with the pivot 46, and has a nut 58 thereon which acts as a stop for engagement with the rear edge of a related one of the side bars 10.

A retaining spring 60 has a coil 61 circumposed on the pivot pin extension 52, between the head 54 and the adjacent side bar 10, and has on its ends, divergent rearwardly extending upper and lower arms 62 and 64, respectively. The lower spring arm 64 is engaged behind the bolt 56, and the upper spring arm 62 is engaged behind the adjacent lateral arm 12, whereby the toggle plate 48 is releasably biased toward its forward retaining position, wherein the nut 58 bears aaginst the rear edge of a side bar 10.

Means for releasing the hook element 32 to swing gravitationally to a downwardly angled released position, shown in phantom lines in FIGURE 2, comprises a vertical rod 66 which extends downwardly through a vertical bore 68 provided at the middle of the hand-grip cross bar 20, and has, on its upper end and spaced above the cross bar, a rounded disc knob 70. The rod 66 has a laterally offset lever portion 72 which slides through openings 74 and 76, provided in the brace bar 24 and the lateral arm 12, remote from the spring 60. The offset portion 72 terminates, at its lower end in a right angled detent pin 78 which extends through vertically elongated closed slots 80, formed in both side bars 10 and reaching below the toggle plate 48. The lower edge 82 of the toggle plate 48 is formed with a vertical notch 84 which is forward positioned in the edge 82 so as to be in alignment with the slots 80, in the forward retaining position of the toggle plate, and to be engaged by the pin 78. An expanding coil spring 86 is circumposed on the rod 66 and is compressed between the hand-grip cross bar 20 and the knob 70, whereby the rod 66 is biased upwardly and maintains the pin 78 at the upper ends of the side bar slots 80 and engaged in the toggle plate notch 84, so as to positively prevent the toggle plate 48 from being moved rearwardly out of its retaining position, until and unless the rod 66 is moved downwardly, against the resistance of the spring 86, by application of manual pressure upon the knob 70, far enough to move the pin 78 downwardly out of the notch 84.

With the pin 78 held out of the toggle plate notch 84, by continued downward pressure on the knob 70, downward pressure exerted on the hook element 52 by a bale (not shown) with which the hook element is engaged, swings the hook element downwardly out of its operative position, so that the hook element is more easily removed from a bale in which it is impaled.

As the hook element 32 is angled downwardly as above outlined and as shown in phantom lines in FIGURE 1, the rear end of the hook element rises and pushes the links 66 upwardly and the toggle plate 48 is thereby swung rearwardly and upwardly from its retaining position, against the resistance of the spring 60, as also shown in phantom lines in FIGURE 1.

The hook element 32 is restored to and locked in its elevated operative position, simply by letting the spring 60 move the toggle plate 68 forwardly and downwardly from its elevated released position, accompanied by descent of the links 42 until the toggle plate 48 approaches its forward retaining position. At this point the knob 70 is depressed, against the resistance of the spring 86 so as to depress the rod pin 78 out of the way of the toggle plate 48 so as to permit the toggle plate to go into its full retaining position, whereat the knob 70 is released, so that the spring 86 expands and the pin 18 rising into locking engagement with the toggle plate notch 84.

Although there have been shown and described herein preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A bale hook comprising a pair of elongated side bars, means spacing and connecting said side bars, said side bars having first and second ends, a bail handle fixed on the side bars at their second ends, said handle having a cross bar, a hook element disposed between said side bars and pivoted intermediate its ends on the side bars at their first ends, link means positioned along said side bars and having a first end pivoted to the adjacent end of the hook element, said link means having a second end, a toggle plate positioned between said side bars, said toggle plate being pivoted to the side bars and pivoted to the second end of said link means, stop means on said toggle plate to engage one side of said side bars in a retaining position of the toggle plate, a rod working through said handle cross bar, said rod having a first end spaced from said cross bar and a second end, spring means biasing the first end of the rod away from the handle, a lateral detent pin on the second end of the rod, said side bars having slots through which said detent pin extends, and said toggle plate having a free end having a notch in which said detent pin is engaged only in the retaining position of the toggle plate.

2. A bale hook comprising a pair of elongated side bars, means spacing and connecting said side bars, said side bars having first and second ends, a bail handle fixed on the side bars at their second ends, said handle having a cross bar, a hook element disposed between said side bars and pivoted intermediate its ends on the side bars at their first ends, link means positioned along said side bars and having a first end pivoted to the adjacent end of the hook element, said link means having a second end, a toggle plate positioned between said side bars, said toggle plate being pivoted to the side bars and pivoted to the second end of said link means, stop means on said toggle plate to engage one side of said side bars in a retaining position of the toggle plate, a rod working through said handle cross bar, said rod having a first end spaced from said cross bar and a second end, spring means biasing the first end of the rod away from the handle, a lateral detent pin on the second end of the rod, said side bars having slots through which said detent pin extends, and said toggle plate having a free end having a notch in which said detent pin is engaged only in the retaining position of the toggle plate, and second spring means urging said toggle plate toward its retaining position.

3. A bale hook comprising an elongated member, a hook pivoted intermediate its ends on said member, toggle linkage comprising a toggle plate pivoted on said elongated member, a link pivoted to one end of said hook, the toggle plate and link being pivotally connected at a point which forms the central pivot of the toggle linkage, said central pivot being adjacent the toggle linkage center line in the hook retaining position and remaining on the same side of the center line at all times so that any weight on the hook will tend to collapse the toggle linkage and allow the hook to pivot to a weight releasing position, and stop means located on said toggle plate and engageable with said member only in the hook retaining position of the toggle plate, spring means urging the toggle plate toward retaining position, and releasable means engaged with said member and engageable with the toggle plate only in its retaining position for locking the toggle plate in its retaining position.

4. The bale hook according to claim 3 wherein said locking means comprises a rod mounted for endwise movement along said elongated member, said rod having a knob on one end and a lateral detent pin on its other end, said member having an elongated slots means through which the detent pin extends, said toggle plate having a notch adapted to align with said slot only in the retaining position of the toggle plate and in which said detent pin is engageable.

5. The bale hook according to claim 4 which includes in addition second spring means urging said rod in a direction to engage the detent pin in the toggle plate notch.

6. The bale hook according to claim 5 which includes in addition a bail handle fixed on said elongated member having a crossbar through which said rod works, a knob fixed on the rod and spaced from the side of the crossbar remote from the toggle plate, said second spring means being compressed between said knob and the handle crossbar.

References Cited in the file of this patent

UNITED STATES PATENTS

| | | |
|---|---|---|
| 1,116,688 | Gaskill | Nov. 10, 1914 |
| 1,180,196 | Schepp | Apr. 18, 1916 |
| 2,575,986 | Yoder | Nov. 20, 1951 |
| 2,628,857 | Nelson | Feb. 17, 1953 |
| 2,970,001 | Sobotka | Jan. 31, 1961 |